US008668093B2

(12) United States Patent
Ge et al.

(10) Patent No.: US 8,668,093 B2
(45) Date of Patent: Mar. 11, 2014

(54) ATMOSPHERIC PRESSURE MICROWAVE PLASMA TREATED POROUS MEMBRANES

(75) Inventors: Jijun Ge, Boxborough, MA (US); Alketa Gjoka, Malden, MA (US); Jieh-Hwa Shyu, Andover, MA (US)

(73) Assignee: Entegris, Inc., Billerica, MA (US)

( * ) Notice: Subject to any disclaimer, the term of this patent is extended or adjusted under 35 U.S.C. 154(b) by 42 days.

(21) Appl. No.: 13/105,210

(22) Filed: May 11, 2011

(65) Prior Publication Data

US 2011/0210063 A1 Sep. 1, 2011

Related U.S. Application Data

(62) Division of application No. 12/295,727, filed as application No. PCT/US2007/007782 on Mar. 28, 2007, now Pat. No. 7,563,401.

(60) Provisional application No. 60/788,802, filed on Apr. 3, 2006, provisional application No. 60/833,570, filed on Jul. 27, 2006.

(51) Int. Cl.
*B01D 39/00* (2006.01)
*H05H 1/26* (2006.01)

(52) U.S. Cl.
USPC ............. 210/500.27; 210/500.36; 427/488; 427/491; 264/423

(58) Field of Classification Search
USPC ........ 210/500.36, 500.27; 427/488, 491, 435; 428/500; 264/423
See application file for complete search history.

(56) References Cited

U.S. PATENT DOCUMENTS

| | | | |
|---|---|---|---|
| 4,353,799 A | 10/1982 | Leonard | |
| 4,784,769 A * | 11/1988 | Giordano et al. | 210/500.21 |
| 4,946,903 A | 8/1990 | Gardella, Jr. et al. | |
| 5,282,965 A * | 2/1994 | Urairi et al. | 210/500.36 |
| 5,451,453 A * | 9/1995 | Gagnon et al. | 428/305.5 |
| 5,462,781 A | 10/1995 | Zukowski | |
| 5,679,264 A | 10/1997 | Gsell | |
| 5,874,705 A | 2/1999 | Duan | |
| 5,895,558 A | 4/1999 | Spence | |
| 5,928,792 A | 7/1999 | Moya | |
| 6,074,534 A | 6/2000 | Goudmand et al. | |
| 6,118,218 A | 9/2000 | Yializis et al. | |
| 6,203,850 B1 * | 3/2001 | Nomura | 427/245 |
| 6,214,093 B1 | 4/2001 | Nabata et al. | |
| 6,709,718 B2 | 3/2004 | O'Brien | |
| 6,824,872 B2 | 11/2004 | Coates et al. | |
| 6,841,201 B2 | 1/2005 | Shanov et al. | |
| 6,878,419 B2 | 4/2005 | David et al. | |
| 7,220,483 B2 | 5/2007 | Coates et al. | |
| 7,432,470 B2 * | 10/2008 | Kumar et al. | 219/121.59 |
| 7,963,401 B2 * | 6/2011 | Ge et al. | 210/500.36 |
| 2002/0144944 A1 | 10/2002 | Arcella et al. | |
| 2002/0176946 A1 | 11/2002 | O'Brien | |
| 2005/0045103 A1 | 3/2005 | Mikhael et al. | |
| 2005/0164009 A1 | 7/2005 | Rieke | |
| 2010/0035074 A1 * | 2/2010 | Cohen et al. | 428/500 |
| 2012/0031842 A1 * | 2/2012 | Freger et al. | 210/650 |

FOREIGN PATENT DOCUMENTS

| | | |
|---|---|---|
| EP | 0 513 389 A1 | 11/1992 |
| JP | 55022504 B | 7/1974 |
| JP | H04351645 A | 12/1992 |
| JP | H07185267 | 7/1995 |
| JP | H0899088 A | 4/1996 |
| JP | H10503049 | 3/1998 |
| JP | H11300180 | 11/1999 |
| JP | 2000317280 | 11/2000 |
| JP | 2001323091 A | 11/2001 |
| JP | 2002020514 (A) | 1/2002 |
| JP | 2004031509 | 1/2004 |
| WO | WO 92/09357 | 11/1992 |
| WO | WO 97/09167 A1 | 3/1997 |
| WO | WO 01/58577 | 8/2001 |
| WO | WO 03/070784 | 8/2003 |
| WO | WO 2004/007060 | 1/2004 |
| WO | WO 2004/070784 | 8/2004 |
| WO | WO 2005/010619 | 2/2005 |

OTHER PUBLICATIONS

JP2000317280(A), Publication date Nov. 21, 2000, "Machine translation".*
International Search Report and Written Opinion for PCT/US2007/07782 filed Mar. 29, 2007 from which the above identified application claims priority.
Shenton, et al., *J. Polymer Science: Part A* 40:95-109 (2002) "Chemical-Surface Modification of Polymers using Atmospheric Pressure Nonequilibrium Plasmas and Comparisons with Vacuum Plasmas".
Shenton, et al., *J. Phys D: Applied Physics* 34:2761-2768 (2001) "Surface Modification of Polymer Surfaces: Atmospheric Plasma Versus Vacuum Plasma Treatments".
Kasemura, et al., *J. Adhesion* 33:33 (1990) Surface Modification of Fluorinated Polymers by Microwave Plasmas.
Wertheimer, et al., *Pure & Appl. Chem.*, 66:6: 1343-1352 (1994) "Processing of Electronic Materials by Microwave Plasma".
Extended European Search Report for EP Application No. EP 07754320.5-2113, dated Feb. 7, 2012.
Search Report for Patent Application for Taiwan Patent Application No. 096111797, "Atmospheric Pressure Microwave Plasma Treated Porous Membranes", dated Dec. 2, 2012 (English translation attached).
International Preliminary Report on Patentability for International Application No. PCT/US2007/007782, "Atmospheric Pressure Microwave Plasma Treated Porous Membranes", dated Nov. 3, 2009.
Translation of Notice of Rejection issued in Japanese Patent Application No. 2009-504208, Title: Atmospheric Pressure Microwave Plasma Treated Porous Membranes, Date of Receipt of Translation of Office Action Aug. 15, 2013.

* cited by examiner

*Primary Examiner* — Ana Fortuna
(74) *Attorney, Agent, or Firm* — Hamilton, Brook, Smith & Reynolds, P.C.

(57) ABSTRACT

Versions of the invention include compositions and methods for making them that include a polymeric porous membrane with one or more atmospheric pressure microwave plasma modified surfaces. The modified porous membrane is stable, non-dewetting, and retains its mechanical strength.

18 Claims, No Drawings

ATMOSPHERIC PRESSURE MICROWAVE PLASMA TREATED POROUS MEMBRANES

CROSS-REFERENCES TO RELATED APPLICATIONS

This is a divisional application of U.S. application Ser. No. 12/295,727, now U.S. Pat. No. 7,563,401 which is a U.S. National Stage of International Application No. PCT/US2007/007782, filed Mar. 28, 2007, which claims the benefit of U.S. Provisional Application Ser. No. 60/788,802, filed Apr. 3, 2006 and U.S. Provisional Application Ser. No. 60/833,570, filed Jul. 27, 2006, these applications incorporated herein by reference in their entirety.

BACKGROUND

Filtration can be used in the pharmaceutical, microelectronics, chemical and food industries to provide product and process purity. In these applications, porous membranes can remove particulate, ionic, and other contaminants from fluids. These porous membranes, whose pore size can range from the ultrafiltration (approximately 0.001 µm) to microfiltration (approximately 10 µm), can be made from a chemically compatible and mechanically stable polymeric matrix and have measurable retention, pore size or pore size distribution, and thickness. The size of pores in microporous membranes can range on the order of from about 0.01 to about 5.0 microns, and can be chosen depending upon the particle size or type of impurity to be removed, pressure drop requirements, and viscosity requirements of the application. In use, the porous membranes are generally incorporated into a device which is adapted to be inserted within a fluid stream to effect removal of particles, microorganisms or a solute from process fluids.

Fluid filtration or purification is usually carried out by passing the process fluid through the membrane filter under a differential pressure across the membrane which creates a zone of higher pressure on the upstream side of the membrane than on the downstream side. Liquids being filtered experience a pressure drop across the porous membrane and the membrane is subject to a mechanical stress. This pressure differential can also result in the precipitation of dissolved gases from the liquid; the liquid on the upstream side of the porous membrane has a higher concentration of dissolved gases than the liquid on the downstream side of the porous membrane. This occurs because gases, such as air, have greater solubility in liquids at higher pressures than in liquids at lower pressures. As the liquid passes from the upstream side of the porous membrane to the downstream side, dissolved gases can come out of solution and form bubbles in the liquid and or on porous membrane surfaces. This precipitation of gas is commonly referred to as outgassing of the liquid. Outgassing of a liquid can also occur spontaneously without a pressure differential as long as the liquid contains dissolved gases and there is a driving force for the gases to come out of solution, such as nucleating sites, a change in temperature, or a change in chemical composition that results in the formation of bubbles or gas pockets on the surfaces of a porous membrane. Outgassing liquids typically used in the manufacture of pharmaceuticals, semiconductor devices, and displays can include very high purity water, ozonated water, peroxide containing liquids, organic solvents such as alcohol, and others liquids chemically active, such as concentrated aqueous acids or bases which can contain an oxidizer.

Membrane filtration of these chemically active liquids benefits from the use of a chemically inert filter to prevent membrane degradation and loss of integrity which can result in extractable material being released from the filter during use. Membrane filters made from halogenated polyolefins, for example fluorine containing polymers like polytetrafluoroethylene are commonly utilized in these applications. Fluorine-containing polymers are well known for their chemical inertness and excellent resistance to chemical attack. Fluorine containing polymer membranes have low surface energy, they are hydrophobic, and therefore membranes made from such polymers are difficult to wet with aqueous liquids or other liquids, which have significantly greater surface tension than the surface energy of the membrane. During the filtration of outgassing liquids with a hydrophobic porous membrane, the porous membrane can provide nucleating sites for dissolved gases to come out of solution under the driving force of the pressure differential during the filtration process. Gases which come out of solution at these nucleating sites on the hydrophobic membrane surfaces, including the interior pore surfaces and the exterior or geometric surfaces, can form gas pockets which adhere to the membrane. As these gas pockets grow in size due to continued outgassing, they may begin to displace liquid from the pores of the membrane which can reduce the effective filtration area of the membrane. This phenomenon is usually referred to as dewetting of the porous membrane since the liquid-wetted, or liquid-filled portions of the porous membrane are gradually converted into gas-filled portions.

Dewetting of a porous membrane can also occur spontaneously when a wet membrane, such as a hydrophobic membrane wet with an aqueous fluid, is exposed to a gas such as air. It has been found that this dewetting phenomenon occurs more frequently and is more pronounced in fluorocarbon-based membranes. It has also been found that the rate at which dewetting occurs is greater in small pore size membranes such as 0.2 microns or less, than in larger pore size membranes.

Thus, as the membrane filter dewets with time, it becomes more difficult to purify or filter the same volume of process liquid per unit time as when the filter was newly installed and therefore completely wet. Installation of new filter, re-wetting the dewet filter, or changes in process to compensate for the reduced liquid flow translate into higher operating costs for the user. Re-wetting is time consuming, often utilizes flammable liquids which must be disposed of, and requires flushing which takes time.

PTFE membrane surfaces have been treated to modify their properties and make them more hydrophilic. One method described in International Patent Publication Number WO 03/070784 discloses a method to improve the biocompatibility of a membrane by exposing it to a reactant solution, for example sodium hydroborate and anthroquinone in a solvent like dichloromethane, and exposing the membrane and solution to heat or UV. International Patent Publication Number WO/04/007060 discloses a method to Modify PTFE membrane via UV radiation in the presence of $Na_2SO_3$ or other chemicals. These methods involve use of sodium containing reagents which can result in metal extractables from the membrane and require extensive flushing of the membrane before use in high purity applications. Another method to make hydrophilic PTFE membranes is to coat PTFE with hydrophilic chemicals as described in U.S. Patent Application Publication No.: 20020144944 and International Patent Publication Number WO/01/58577. Coating porous membranes can be used to change the surface energy of the composite membranes, however the coating is typically applied to a membrane from a solvent, for example an organic solvent, and requires a curing step. This coating process can modify the pore size of the porous membrane and creates chemical waste that needs to be removed and disposed of adding to the cost and time for membrane manufacturing.

Dry methods can be used to modify porous PTFE membranes. U.S. Pat. No. 5,282,965 discloses radio frequency (RF) vacuum plasma treating PTFE membranes at pressures between about 0.01 torr and 10 ton to effect membrane modification and prevent membrane fibril breakage. It was also disclosed that the membrane is placed at an electrode-to-membrane distance of from 1 to 20 cm, to prevent or avoid damage to the membrane surface. It would not have been obvious from this disclosure that atmospheric pressure or porous membrane contact with the electrode could be used to modify membrane without causing fibril breakage or membrane damage that could lead to weakening of the porous membrane.

U.S. Pat. No. 6,074,534 discloses a device for implementing a method of increasing the wettability of a porous body in a microwave generated plasma in vacuum conditions. The porous bodies are made from sintered powders, for example polyethylene, to form marker tips having a pore in the range from 1 micron to about to 50 microns. The disclosure does not disclose compositions or indicate how thin porous membranes, or microporous membrane of relatively inert polymers like PTFE could be treated at atmospheric pressure to form porous materials with stable wettability and high strength.

Using microwave coupled atmospheric pressure non-equilibrium plasma (Shenton et al. J. Polymer Science: Part A, vol 40, 95-109, (2002), and Shenton et al. J. Phys D: Applied Physics, vol 34, 2761-2768, (2001)) Shenton observed surface cleaning (removal of weak boundary layer such as grease, release agents, or surface contamination), crosslinking and branching, and surface-chemical structure modification of 0.1 to 1 mm thick non-porous commodity polymer substrates such as HDPE, LDPE, polypropylene, and PET. Shenton observed enhancement of the surface properties such as the surface energy of the substrates. Shenton et al. did not modify thin porous membranes and did not prepare porous membrane contact wettable materials with long term wettability that were non-dewetting and that substantially retained the base membrane strength.

U.S. Pat. No. 6,709,718 discloses RF atmospheric plasma treatment of porous membranes that include a cavitating agent. The RF atmospheric plasma treatment was reported to improve the hydrophilic properties of the membrane (porous sheet 0.1 micron to 10 micron pores of polypolyolefin including the cavitating agent). Film samples tested for ink infiltration had values less than about 60% indicating that the porous membranes were not completely contact wettable with the ink.

U.S. Pat. No. 5,895,558 discloses atmospheric pressure RF plasma (13.5 MHz) treatment of plastic films, webs, or porous substrates to make them hydrophilic. Short treatment times, for example 15, 8, and 5 seconds were used for spun bonded polypropylene sample to make them water wettable. These materials were not immediately wettable, and appear to require from about 3 to about 10 second absorption times. Short exposure times and use of thick meltblown materials were used to reduce damage to the substrate being treated. It would not have been obvious to use longer treatment times to form hydrophilic materials, especially on thin porous membranes, without causing damage to the membranes.

U.S. Pat. No. 6,118,218 discloses incorporating a porous metallic layer in one of the electrodes of a plasma treatment system. A plasma gas is injected into the electrode at substantially atmospheric pressure and allowed to diffuse through the porous layer, thereby forming a uniform glow-discharge plasma. Organic films such as polypropylene, polyethylene, and polyethylene teraphthalate substrates, commonly used in the food-packaging industry, were treated in the plasma at atmospheric conditions. Various AC-voltage frequencies were used in the 60 Hz to 20 kHz range without noticeable difference in the results. It was disclosed that a steady glow discharge could be produced at substantially lower frequencies than previously possible. Many tests were run routinely with success at 1 kHz, and good glow discharge was produced at frequencies as low as 60 Hz. The surface energy of the modified films appeared to decrease with time following atmospheric plasma treatment, some decreased by up to 20% or more.

T. Kasemura, S. Ozawa, K. Hattori, "Surface Modification of Fluorinated Polymers by Microwave Plasmas," J. Adhesion, 33: 33 (1990) observed improved wettability of microwave plasma treated film samples with decreasing pressure.

SUMMARY

Versions of the invention include compositions comprising a porous polymeric membrane where one or more surfaces of the membrane have been modified by an atmospheric pressure microwave (APMW) plasma. The plasma modified membrane is non-dewetting and can be wet on contact with a first solution of MeOH in water, where the minimum amount of MeOH in water in the first solution to contact wet the APMW plasma modified porous membrane is less than the minimum amount of MeOH in water in a reference or control solution that contact wets an untreated, neat sample of the porous membrane. In some versions of the invention the membrane is modified while in contact with a rotating electrode of the plasma generating device. The membrane can be used in various articles for heat and mass transfer including filters, and liquid membranes.

Some versions of the invention are compositions comprising an uncoated porous polymeric membrane made from a halogenated polyolefin where one or more surfaces of the membrane have a structure and chemistry modified by an atmospheric pressure microwave plasma treatment. The plasma modified membrane is non-dewetting and wettable with a solution of 96 wt % or less of MeOH in water while an untreated sample is contact wet with a solution of 97 wt % of MeOH in water.

The surface of the membrane can be modified in an APMW plasma comprising a source of oxygen. The non-dewetting surface modified membrane can have an oxygen to carbon ratio that differs from the untreated membrane. In versions of the porous membrane composition the O/C ratio characterizes a membrane that is homogeneously wettable with a first solution of MeOH in water, where the minimum amount of MeOH in water in the first solution to contact wet the APMW plasma modified porous membrane is at least 1 wt % less than the minimum amount of MeOH in water in a reference or control solution that contact wets an untreated, neat sample of the porous membrane. In some versions the first solution is a methanol and water mixture having 96% or less by wt of MeOH. In some versions the of the invention the O/C ratio of the modified membrane surfaces can be between about 0.06 and about 0.08. In some versions the of the invention the O/C ratio of the modified membrane surfaces can be between about 0.04 and about 0.08.

Surfaces of the porous membrane modified by the atmospheric pressure microwave plasma in version of the invention have surface functional groups and morphology that make it contact wettable with a first solution of MeOH in water, where the minimum amount of MeOH in water in the first solution to contact wet the porous membrane is at least 1 wt % less, and in some versions at least 4% less, than the minimum amount of MeOH in water in a reference solution that contact wets an untreated sample of the porous membrane. The contact wettability of these microwave plasma treated polymeric membrane surfaces remains unchanged or essentially unchanged and or remains stable or essentially stable for 10 days or more. The plasma modified polymeric porous membrane are non-dewetting such that the composition remains wet with liquid after contacting a gas containing liquid.

The porous membrane that is atmospheric pressure microwave plasma modified can be a single layer having pores or a distribution of pores that provide sieving particle retention. In some versions the porous membrane can comprises one or more layers which can have pores that have the same or different size in the various layers. The porous membrane can have a thickness and chemical resistance suitable for its intended use, in some versions the membrane is less than about 30 microns thick. The porous membrane can be uncoated.

In versions of the invention, the combination of microwave power, membrane temperature, gas type and gas flow, plasma density, and treatment time functionalize surfaces of the porous membrane and provide it with improved and stable wettability while substantially retaining the strength of the un-modified porous membrane. The combination of plasma conditions provide porous membranes that are non-dewetting. These atmospheric pressure microwave plasma surface modified porous membranes can have a strength is at least 70%, at least 80%, or at least 90% or more of the strength of the porous membrane without the atmospheric pressure microwave plasma modified surface.

One version of the invention is a composition comprising an microporous polymeric membrane of a halogenated polyolefin, the microporous membrane having a sieving LRV of at least 3 for 0.1 micron or smaller particles in a liquid like water. The microporous membrane has one or more atmospheric pressure microwave plasma modified surfaces on the membrane that are rapidly, for example 1-2 seconds, and uniformly wet with a solution of 96 wt % or less MeOH in water placed on the modified surfaces. The APMW plasma modified porous membrane surfaces are stable such that the wettability of the composition is unchanged or essentially the same after 10 or more days, in some versions 70 or more days under ambient storage. The microporous membrane in versions of the invention can include surfaces modified by an atmospheric pressure microwave plasma comprising a noble gas or a noble gas with a source of oxygen. The atmospheric pressure microwave plasma modified microporous membrane has a sieving LRV of at least 3 for 0.1 micron or smaller particles in a liquid like water. In some versions the microporous polymeric membrane is coating free before the atmospheric pressure microwave plasma treatment.

One version of the invention is a composition that comprises or includes a microporous polymeric membrane of a halogenated polyolefin, the microporous membrane having a sieving LRV of at least 3 for 0.1 micron or smaller particles in a liquid like water. The microporous membrane has one or more atmospheric pressure microwave plasma modified surfaces on the membrane that are contact wet with a solution, wherein the minimum amount of methanol in water in the solution to contact wet the treated porous membrane is at least 1 wt % less, in some embodiments 4 wt % less, than the minimum amount of methanol in water in a reference solution used to contact wet the untreated porous membrane. The APMW plasma modified porous membrane surfaces are stable such that the wettability of the composition is unchanged or essentially the same after 10 or more days, in some versions 70 or more days stored under ambient conditions as a dry membrane in air. The microporous membrane in versions of the invention can include surfaces modified by an atmospheric pressure microwave plasma comprising a noble gas or a noble gas with a source of oxygen. The atmospheric pressure microwave plasma modified microporous membrane has a sieving LRV of at least 3 for 0.1 micron or smaller particles in a liquid like water. In some versions the microporous polymeric membrane is coating free before the atmospheric pressure microwave plasma treatment.

The surface of the microporous membrane can be modified in a plasma that can comprise a source of oxygen. The non-dewetting surface modified membrane can have an oxygen to carbon ratio that differs from the non-plasma treated base microporous membrane. In versions of the composition the O/C ratio of a modified surface characterizes a membrane that is homogeneously wettable, or contact wettable with a first solution of MeOH in water, where the minimum amount of MeOH in water in the first solution to contact wet the porous membrane is at least 1 wt % less than the minimum amount of MeOH in water in a reference solution that contact wets an untreated sample of the porous membrane. In some versions the of the invention the O/C ratio of the modified microporous membrane surfaces can be between about 0.04 and about 0.08 or from about 0.06 to about 0.08 In some versions the microporous polymeric membrane is coating free before the atmospheric pressure microwave plasma treatment with a plasma comprising a source of oxygen.

The atmospheric pressure microwave plasma modified surface(s) of the polymeric microporous membranes have surface functional groups and structure or morphology that is wettable with a first solution of MeOH in water, where the minimum amount of MeOH in water in the first solution to contact wet the porous membrane is at least 1 wt % less than the minimum amount of MeOH in water in a reference solution that contact wets an untreated sample of the porous membrane, where the wettability of these surfaces is essentially unchanged or is essentially stable after 10 or more days. The plasma modified polymeric porous membrane surfaces are non-dewetting such that the composition remains wet with liquid after contacting gas containing liquid.

The microporous membrane that is atmospheric pressure microwave plasma modified can be a single layer having pores or a distribution of pores that provide sieving particle retention. In some versions the microporous membrane can comprises one or more layers which can have pores that have the same or different size in the various layers. The microporous membrane can have a thickness and chemical resistance suitable for its intended use, in some versions the membrane is less than about 30 microns thick. In some versions of the invention the atmospheric pressure microwave plasma modified microporous membrane can have a sieving LRV of at least 3 for 0.1 micron or smaller particles in a liquid; in some versions it can have a sieving LRV of at least 3 for 0.05 micron or smaller particles in a liquid; in still other versions the modified microporous membrane can have a sieving LRV of at least 3 for 0.03 micron or smaller particles in a liquid.

The conditions of power, temperature, gas type and gas flow, plasma density, and plasma treatment time functionalize surfaces of the porous membrane and form a contact wettable porous membrane that is non-dewetting following contact with a gas containing liquid, and that substantially maintains the strength properties of the untreated membrane. Theses atmospheric pressure microwave plasma surface modified porous membranes have a strength is at least 70%, at least 80%, or at least 90% of the strength of the porous membrane without the atmospheric pressure microwave plasma modified surface. These atmospheric plasma modified microporous membrane can be used in various articles including filters and liquid membranes.

One version of the invention is a method of modifying the lyophilicity of one or more surfaces of a porous article. The method can comprise the acts or steps of contacting a porous membrane, in some instances an uncoated porous membrane, with a gas containing atmospheric pressure microwave plasma and treating a surface of the porous membrane with the plasma. The treated porous membrane surface may include nodes, fibrils, pore interiors, portion of the pores, outer surfaces of membrane, and combinations of these. The surfaces of the porous membrane interact and or react with the plasma. The interaction of the plasma with the porous membrane continues until the contact wettability of the article is increased such that the porous membrane is non-dewetting and the strength or average strength of the membrane is not reduced below about 70% of the strength of the uncoated porous membrane. The treatment can occur in a continuous process.

In some versions of the invention the porous membrane is a microporous membrane and in still other versions the porous membrane can be an uncoated microporous membrane. The microporous membrane can have a sieving LRV of at least 3 for 0.1 micron or smaller particles in a liquid; can have a sieving LRV of at least 3 for 0.05 micron or smaller particles in a liquid; can have a sieving LRV of at least 3 for 0.03 micron or smaller particles in a liquid. The porous or microporous membrane can comprise a halogenated polyolefin.

Embodiments of the invention can include a composition comprising a halogenated polyolefin microporous membrane having an LRV of at least 3 for 0.1 micron or smaller particles in water, the modified membrane has one or more surfaces with an O/C ratio of greater than about 0.06. Embodiments of the porous membrane are contact wettable after 10 or more days with a solution of 96 wt % or less of MeOH in water and is non-dewetting after autoclave treatment at a temperature of about 135° C. in water for about 40 minutes. In some versions of the composition, the halogenated polyolefin is polytetrafluoroethylene. Versions of the composition can be a microporous membrane that has a web direction strength (WD) and a (machine direction strength) MD of at least 12 Newtons when the membrane has a thickness about 30 microns or less. In some embodiments the microporous membrane is contact wettable with a solution of 94 wt % or less of MeOH in water and is non-dewetting after autoclave treatment at a temperature of about 135° C. in water for about 40 minutes.

These contact wettable microporous membranes can have one or more regions or layers and have less than about 200 ppb total for extractable ions including calcium and sodium. In some embodiments the O/C ratio of the porous membrane surface ranges from about 0.06 to about 0.08.

The surface of the porous membrane can be modified in an atmospheric microwave plasma that can comprise a source of oxygen, and in some versions a source of oxygen in an inert gas or noble gas whose composition differs from air. The non-dewetting surface modified porous membrane can have an oxygen to carbon ratio that differs from the non-plasma treated base porous membrane. In versions of the composition the O/C ratio of a modified surface characterizes a porous membrane that is homogeneously wettable or contact wettable with a solution of MeOH in water, where the minimum amount of MeOH in water in the solution to contact wet the porous membrane is at least 1 wt % less than the minimum amount of MeOH in water in a reference solution that contact wets an untreated sample of the porous membrane. In some versions the of the invention the O/C ratio of the modified porous membrane surfaces can be between about 0.04 and about 0.08 or from about 0.06 to about 0.08

The atmospheric pressure microwave plasma method forms modified surface(s) on the polymeric porous membranes that have surface functional groups and structure or morphology that is wettable, and preferably contact wettable, with a solution of MeOH in water, where the minimum amount of MeOH in water in the solution to contact wet the porous membrane is at least 1 wt % less than the minimum amount of MeOH in water in a reference solution that contact wets an untreated sample of the porous membrane, and where the wettability of these surfaces is essentially unchanged or is essentially stable after 10 or more days. The atmospheric pressure microwave plasma modified polymeric porous membrane surfaces are non-dewetting such that the composition remains wet with liquid after contacting gas containing liquid.

The method can be used to modify coating free or coated porous membranes. The porous membranes can be microporous membranes in some versions of the invention. The atmospheric pressure microwave plasma method in versions of the invention can be used to modify a porous membrane that can include one or more layers. For example, the porous membrane can have a single layer with pores or a distribution of pores that provide sieving particle retention. In some versions the porous membrane can comprises one or more layers which can have pores that have the same or different size in the various layers. The microporous membrane can have a thickness and chemical resistance suitable for its intended use, in some versions the membrane is less than about 30 microns thick. The atmospheric pressure microwave plasma method can be used to modified microporous membranes that have a sieving LRV of at least 3 for 0.1 micron or smaller particles in a liquid like deionized or purified water; that have a sieving LRV of at least 3 for 0.05 micron or smaller particles in a liquid; or that have a sieving LRV of at least 3 for 0.03 micron or smaller particles in a liquid.

The conditions of power, temperature, gas type and gas flow, plasma density and time used for the atmospheric pressure microwave plasma treatment method functionalizes surfaces of the membrane; the porous membrane formed by the method is contact wettable, non-dewetting, and retains a substantial portion or majority of the strength of the untreated membrane. These atmospheric pressure microwave, plasma surface modified porous membranes have a strength that is at least 70%, in some versions at least 80%, or in other versions at least 90% of the strength of the porous membrane without the atmospheric pressure microwave plasma modified surface. The membrane is non-dewetting following autoclave treatment at a temperature of about 135° C. in water for 40 minutes or about 40 minutes. These atmospheric plasma modified porous membranes can be used in various articles including filters and liquid membranes.

The method to treat the porous membrane with the atmosphere pressure microwave plasma can include an atmosphere that comprises a gas that improves the contact wettability of the membrane. In some embodiments the gas can include a source of oxygen. In some versions the source of oxygen may be in a mixture with an inert gas, a noble gas like helium, or a combination of these where the plasma gas composition differs from air. The source of oxygen can be any oxygen containing compound. In some embodiments the oxygen source can be compounds such as water vapor, an alcohol, oxygen gas, or a combination of these. In some versions the source of oxygen is air. Versions of the invention include porous membranes APMW treated with such gases to form modified porous membranes that have improved contact wettability compared to an untreated membrane sample as measured with different MeOH and water solutions; in some versions the APMW plasma treated membranes can be contact wet with a solution of MeOH in water, where the minimum amount of MeOH in water in the solution to contact wet the porous membrane is at least 1 wt % less, and in some embodiments at least 4 wt % less, than the minimum amount of MeOH in water in a reference solution that contact wets an untreated sample of the porous membrane.

The method can further comprise the acts or steps of bonding the atmospheric pressure microwave plasma modified porous membrane with one or more supports, for example but not limited to webs, nets, core, cage, end caps or any combination of these, to form various articles such as filters. The membrane can be further modified by the act of pleating the modified membrane with one or more optional supports such as but not limited to nets, webs, drainage layers, or combinations of these.

Advantageously, versions of the present invention provide a surface modified porous membrane with improved wettability and improved non-dewetting properties without the loss of fibrils or other particle sieving structures compared to the untreated base membrane. The atmospheric plasma microwave modified porous membrane materials maintain a majority of the base membrane's strength and particle retention properties. Unexpectedly, the treatment results in an improved and stable wettability throughout the thickness of the porous membrane at atmospheric pressures.

Advantageously the atmospheric pressure plasma mouthed porous membrane in versions of the invention can be made coating free. For example, the atmospheric pressure microwave plasma treatment can form a non-dewetting porous membrane without a perfluorocarbon copolymer composition or other bound coating to render the membrane surfaces non-dewetting and contact wettable.

Atmospheric pressure microwave plasma treatment of membranes in versions of the present invention can be used in a continuous process to make lyophilically stable, wettable membranes that have substantially the same strength as the untreated porous membrane. Because the process can be run at atmospheric pressure vacuum pumps are not used which decreases process time and operating costs compared with vacuum plasma treatment of porous membranes. Since an externally applied solution based coating on the porous membrane is not used to directly make the porous membranes wettable, the potential for flow loss and or added extractables can be minimized or avoided. Similarly, because organic liquids and ionic containing reagents are not used to modify the surface of the porous membrane in version of the present invention, the porous membranes and methods to make them avoid contaminants like sodium and other metal ions, as well as extensive flushing, drying, and disposal of membrane modifying solvents or reagents.

DESCRIPTION

Before the present compositions and methods are described, it is to be understood that this invention is not limited to the particular molecules, compositions, methodologies or protocols described, as these may vary. It is also to be understood that the terminology used in the description is for the purpose of describing the particular version or versions only, and is not intended to limit the scope of the present invention which will be limited only by the appended claims.

It must also be noted that as used herein and in the appended claims, the singular forms "a", "an", and "the" include plural reference unless the context clearly dictates otherwise. Thus, for example, reference to a "pore" is a reference to one or more pores and equivalents thereof known to those skilled in the art, and so forth. Unless defined otherwise, all technical and scientific terms used herein have the same meanings as commonly understood by one of ordinary skill in the art. Although any methods and materials similar or equivalent to those described herein can be used in the practice or testing of versions of the present invention, the nonlimiting examples of methods, devices, and materials are now described. All publications mentioned herein are incorporated by reference. Nothing herein is to be construed as an admission that the invention is not entitled to antedate such disclosure by virtue of prior invention.

Versions of the invention include a porous polymeric membrane where one or more surfaces of the membrane have been modified by an atmospheric pressure microwave (APMW) plasma. The membrane can be made from a halogenated polyolefin such as but not limited to polytetrafluoroethylene or a modified polytetrafluoroethylene. The porous polymeric membrane can be an uncoated porous membrane and in some versions a microporous membrane.

In some versions the porous polymeric membrane of the invention, the atmospheric pressure microwave (APMW) plasma surface modified membrane has an oxygen to carbon ratio that differs from the untreated membrane and in some embodiments has an O/C ratio of the porous membrane surface is between 0.06 and 0.08. The atmospheric pressure microwave (APMW) plasma surface modified porous membrane has a surface structure such that the minimum amount of methanol in water in a solution to contact wet the treated porous membrane is at least 1 wt % less than the minimum amount of methanol in water in a reference solution to contact wet an untreated sample of (non-APMW plasma treated) porous membrane; in some versions the minimum amount of methanol in water in a solution to contact wet the treated porous membrane is at least 4 wt % less than the minimum amount of methanol in water in a reference solution to contact wet the untreated porous membrane. In some versions of the invention the APMW plasma treated porous membrane is non-dewetting after autoclave treatment at a temperature of 135° C. in water for 40 minutes.

Versions of the atmospheric pressure microwave (APMW) plasma surface modified porous membrane can have a surface structure such that the treated membrane can be wetted by a first solution of methanol and water mixture having 96% or less by wt of methanol. In some versions the treated porous membrane is contact wettable after 10 days with a solution of 96 wt % of methanol in water. The porous membrane can be a perfluorinated material, halogenated polyolefin, or other composition.

The porous polymeric membrane treated by the atmospheric pressure microwave plasma can be a single layer membrane having pore sizes or a distribution of pore size that provide sieving particle retention: In some versions the treated porous membrane comprises a plurality of layers which have pores that have the same size in the various layers or in still other versions the porous membrane can comprises a plurality of layers which have pores that have different sizes in the various layers. The APMW treated microporous membrane has a sieving LRV of at least 3 for 0.1 micron or smaller particles in water. The APMW plasma treated microporous membrane having one or more regions or layers can have less than 200 parts per billion total for extractable ions, for example by a 10% HCl overnight extraction, including calcium and sodium.

In some versions of the invention, the APMW plasma treated microporous membrane having one or more regions or layers can have a strength that is at least 70% of the strength of the untreated porous membrane and in some versions the microporous membrane can be less than 30 microns thick. In some versions the APMW plasma treated microporous membrane having one or more regions or layers can have has a web direction strength (WD) and a machine direction strength MD of at least 12 Newtons when the membrane has a thickness 30 microns or less.

One version of the invention is a method of treating a porous article, for example a porous or microporous membrane to modify the lyophilicity of one or more surfaces thereof, the method comprising the steps of contacting the porous article with an atmospheric pressure microwave plasma containing a gas and treating a surface of the porous article with the plasma. The porous membrane can be a coated or an uncoated porous membrane.

The porous polymeric membrane, which also includes microporous membranes, treated by the method can have a strength that is at least 70% of the strength of the untreated porous membrane. In some versions the APMW plasma treated microporous membrane having one or more regions or layers can have has a web direction strength (WD) and a machine direction strength MD of at least 12 Newtons when the membrane has a thickness 30 microns or less.

The porous or microporous membrane can comprise a halogenated polyolefin. In some versions the membrane can include polytetrafluoroethylene or a modified polytetrafluoroethylene. In some versions the microporous polymeric membrane can be coating free before the atmospheric pressure microwave plasma treatment.

The atmospheric pressure microwave plasma treatment method can be used to treat porous membranes surface selected from nodes, fibrils, pore interiors, portions of the pores, outer surfaces of the membrane, and any combinations of these to make them more hydrophilic or lyophilic than the untreated porous membrane surfaces. The treatment serves to modify the dewetting properties of the porous article. In some versions of the invention the interaction of the plasma with the porous membrane is continued until the contact wettability of the treated membrane is increased such that the treated porous membrane is non-dewetting and the strength or average strength of the membrane is not reduced below 70% of the strength of the untreated porous membrane.

In some versions of the method, the surface of the membrane is modified in an APMW plasma comprising a source of oxygen. The source of oxygen can be selected from water vapor, an alcohol, air, or any combination of these. In some versions of the method, the plasma comprises a noble gas, in other versions it only contains one or more noble or inert gases. The APMW plasma treatment of the membrane can be performed in a continuous process from a spool of porous material sheet.

The APMW plasma treated porous membrane can be bonded to one or more supports. The supports can be selected from webs, nets, core, cage, end caps or any combination thereof to form a filtration cartridge. In some versions of the invention, the treated membrane is further modified by the act of pleating the treated membrane with one or more supports. Supports for the pleated membrane can be selected from nets, webs, drainage layers, or any combinations thereof.

Versions of the invention can include polymeric porous membrane compositions and method for making them that comprise one or more atmospheric pressure microwave plasma modified surfaces on the membrane. Atmospheric pressure microwave plasma treatment of porous membranes provides materials that are contact wettable with a solution of MeOH in water, where the minimum amount of MeOH in water in the solution to contact wet the porous membrane is less than the minimum amount of MeOH in water in a control solution that contact wets an untreated sample of the porous membrane. These compositions can also provide stable wettability, retention of a substantial portion of the mechanical strength of the base membrane, have low extractables, are non-dewetting porous membrane, or combinations of these properties.

These porous membranes may be prepared by a method that can include the acts or steps of contacting one or more surfaces of a porous polymeric Membrane with a microwave generated plasma at a pressure of about atmospheric pressure with a gas until the porous membrane is contact wettable with a solution of methanol and water that contains less methanol than a solution of methanol and water that is used to contact wet the untreated porous membrane. In some versions the method forms a modified halogenated polyolefin porous membrane that is contact wettable with a solution of 96 wt % methanol or less in water, in some versions the modified porous membrane is contact wettable with a solution of 95 wt % or less of MeOH in water; in some versions the modified porous membrane is contact wettable with a solution of 94 wt % or less of MeOH in water; in some versions the modified porous membrane is contact wettable with a solution of 93 wt % or less MeOH in water; in some versions the modified porous membrane is contact wettable with a solution of 92 wt % or less MeOH in water; in some versions the modified porous membrane is contact wettable with a solution of 90 wt % or less MeOH in water. In these embodiments, the unmodified porous membrane is contact wettable with a solution of 97 wt % of MeOH in water. The APMW plasma treated membranes with improved wettability prepared by this method substantially retain the strength properties of the untreated membrane and are non-dewetting as determined by contact with a gas containing liquid such as in an autoclave test of the membrane with water. The APMW plasma treated membranes with improved wettability prepared by this method substantially maintain their contact wettability with a methanol and water solution to within an MeOH concentration in the solution of about 1% or less; the porous membranes retain their wettability for a time greater than about 10 days and in some versions greater than about 70 days. In some versions of the invention the APMW plasma treated membrane retained its contact wettability following ambient storage in air after 10 days or more and in some versions after 70 days or more.

The conditions for atmospheric pressure microwave plasma treatment can be chose to provide surface modified porous membranes that have a strength that is at least 70%, in some versions at least 80%, or in other versions at least 90%, and in still other versions at least 95% of the strength of the unmodified base porous membrane without the atmospheric pressure microwave plasma modified surface. For example, the tensile strength of the membrane may be characterized and compared to the untreated porous membrane. The tensile strength of a sample can be determined by taking a porous membrane sample, for example about 2.5 cm×7.5 cm, in the machine direction (MD) and web direction (WD) respectively. The membrane sample can be clamped by two heads with about a 2.5 cm gap in between them and then pulled from one end. The force data on the pulled membrane sample can be recorded and the maximum load when membrane sample is broken can be determined. The tensile strength of the modified or control porous membrane samples can be calculated based on the measured maximum load and sample size.

Microwave frequencies that can be used to make the modified membrane in versions of the invention can include those microwave frequencies above about 300 MHz. In some versions of the invention the range of microwave frequencies that can be used to treat the porous base membrane can be from about 800 MHz to about 2450 MHz. In some versions of the invention the microwave frequency of the source is about 2.45 GHz (2450 MHz).

The method can further comprise or include the act of bonding the APMW plasma modified membrane with one or more supports such as but not limited to webs, nets, core, cage, end caps or any combination of these to form an exchange cartridge useful for mass and or heat transfer operations. The method can further comprise the act of pleating the APMW plasma modified membrane prior to bonding.

The APMW plasma treated porous membrane can be used to remove impurities, exchange energy, or any combination of these with a fluid that contacts the modified membrane. This conditioned fluid can be used in chemical reactions or processes with other liquids, powders, or substrates.

The atmospheric pressure microwave plasma treatment of the porous membrane occurs for a duration that provides the desired combination and degree of contact wettability, membrane strength, stable wettability, non-dewetting, or combination of these. The porous membrane can be treated in a static (batch) mode, a continuous process, or a combination of these. In some versions of the invention the membrane is modified while in contact with a moving or rotating electrode of the plasma generating device. The plasma treatment can occur in a single plasma exposure, a continuous exposure process on a web or film of a porous membrane, or it can include one or more passes through the atmospheric pressure microwave plasma. In some versions of a continuous treatment process, the rate of passage of the porous membrane through the microwave plasma can range from about 1 meter/second to about 25 meters/sec. In some versions, slower treatment speeds may be used to gain better treatment results. In some versions of the process, the number of passes of the membrane or partially modified version of the membrane through the plasma can range from about 1 to about 10 passes. In some versions the porous membrane is treated by the APMW plasma for about 30 second to about 180 seconds.

The plasma generating-parameters utilized in versions of the invention are not limited to any particular density or power except that they are chosen to make porous membranes with properties such as but not limited to stable wettability, a majority of the mechanical strength of the base membrane, low extractables, a non-dewetting porous membrane, or combinations of these. In some versions the porous membranes can be treated with a total power density that can range from about 30 to about 150 watt/cm$^3$. In some versions the plasma treating density can range from about 90 to about 510 watt-sec/cm$^2$. Power can range from about 400 to about 2400 w. In some versions the power can be 2400 watts or more. Optional pre and post plasma exposure treatments can be chosen to further functionalize surfaces of the membrane.

The invention can include porous membranes, and methods for making them, where the porous membranes have been APMW plasma treated in the presence of gases initially present or fed into the plasma apparatus where the treatment improves the contact wettability of the porous membrane compared to an untreated porous membrane sample. For example, gases such as the noble gases like helium or argon, active gases like oxygen, inert gases like nitrogen, purified sources of inert or noble gases, or more complex gaseous molecules like carbon dioxide and ammonia may be fed into or be present in the plasma. In various embodiments, these gases may be used in mixtures (of two or more gases). Examples of suitable mixtures can include but are not limited to air, a source of extra clean dry air with controlled amounts of an added vapor such as water or other oxygen containing liquid (see for example International Publication No. WO 2005/010619, Lithographic Projection Apparatus, Gas Purging Method, Device Manufacturing method and Purge Gas Supply System, Parekh et al, filed 21, Jul. 2004 and incorporated herein by reference in its entirety), a mixture of noble or inert gases with a source of oxygen that differs from air, a noble gas and an oxygen containing gas, or other suitable gas mixtures may be used. In some versions of the invention the plasma is derived from a gas that comprises a source of oxygen. For example a mixture of an inert or noble gas and oxygen. In some versions the source of oxygen may be but is not limited to air, oxygen, carbon dioxide, water vapor, or combinations of these. In some versions the source of oxygen can include vapor generated from oxygen containing compounds such as peroxides, organic liquids like methanol, water, or combinations of these. In some versions the source oxygen is a gas like ozone, ozone and oxygen, sulfur dioxide, or other gas excluding air. In some versions gaseous mixtures including a source of oxygen can be combined in relative proportions to form a mixture of gas and oxygen that differ from those found in air. In some versions of the invention the membrane is modified with a plasma that is derived from an atmosphere of air. Noble gas refers to He, Ne, Ar, mixtures of these and the like where the noble gas is present in amounts greater than found in air.

The pressure of the gas forming the atmospheric plasma sustains the plasma and interacts with the porous membrane to modify its properties. In some versions of the invention the pressure of the plasma chamber can be maintained without the use of a mechanical vacuum pump. The pressure of the plasma can be about atmospheric pressure. In some versions of the invention, the pressure of the chamber where the membrane is treated with the atmospheric pressure microwave plasma can be atmospheric pressure within about ±250 torr, in some versions the pressure can be atmospheric pressure within about ±50 ton. Pressures other than atmospheric pressure that can be achieved without a mechanical vacuum pump can be used to modify the temperature, mean free path, and number of gas species interacting with the porous membrane surfaces.

The atmospheric pressure microwave plasma treated membranes can be used in filtration devices such as stacked disk (plate and frame modules), spiral wound modules, core and cage cartridges, flat sheet, hollow fiber modules. The APMW plasma treated membrane can be bonded to one or more supports, a core, a cage, or one or more endcaps. Portions or all of these supports, core, cage, endcaps, or other fluid contacting surface may also be plasma treated. One or more nets or drainage layers can also be pleated and bonded on either side of the treated membrane. The atmospheric pressure microwave plasma treated membranes, supports, core, cage, and endcaps can be bonded together to form a cartridge. In some filtration applications a filter device can be in the form of a replaceable or permanently bonded filter cartridge mounted in a housing, which has input and output ports in the process flow path. Such a filter cartridge can have a pleated membrane arranged in a cylindrical configuration.

The combination of atmospheric pressure, gases in the plasma, microwave frequency, and thermal conditions of the microwave plasma results in a membrane surface with a chemical and physical structure that maintain their strength, provides stable contact wettability, and provides non-dewetting membranes.

The atmospheric pressure microwave plasma modified porous membrane surface in versions of the present invention has a chemical structure that provides increased wettability or increased surface energy, compared to the un-modified porous membrane. The modification is stable such that the contact wettability remains essentially constant over time, or the wettability changes by 1% or less in the added amount of MeOH in the solution used to contact wet the membrane following the initial plasma treatment. In some versions of the treated membrane, the wettability does not change with time after ambient storage in air after at least 1.0 days, in some versions after at least 30 days, and in still some other versions after at least 70 days or more. Stable contact wettability is beneficial because treated membranes that have been stored following the plasma treatment have consistent properties during use or storage and are not limited by a shelf life.

The one or more porous membrane surfaces modified by reaction or interaction with the microwave plasma forms a treated substrate that has a pressure drop, sieving particle retention characteristics, membrane strength, membrane thickness, or any combination of these that is within about ±25% of the untreated membrane; in some versions within about ±15% of the untreated membrane, and in still other versions within ±10% or less of the untreated membrane. This is advantageous because existing membranes can be APMW plasma treated without substantially adversely affecting their strength, or physical structural properties.

The non-dewetting surfaces of the atmospheric pressure microwave plasma modified membranes in versions of the invention can include polar functional groups that are formed on the surfaces of the porous membrane; these functional groups modify the chemical structure of the membrane surfaces. These functional groups can be formed by the one or more gases in the plasma interacting or reacting with the porous membrane. The functional groups can include but are not limited to —C—O—C—, —C—OH, —C=O, —C(F)=; —SO$_3$H, —SO$_2$—, and other lyophilic and or hydrophilic groups that increase the wettability or surface energy of the membrane surfaces. By increasing the surface energy of the membrane surfaces the membrane become more lyophilic and contact wettable with a liquid. In some versions the membrane can be characterized as becoming more hydrophilic where the liquid is water, comprises water, or is an aqueous solution. A more hydrophilic membrane is illustrated by a decrease in the amount of MeOH in a mixture with water that contact wets the membrane. The lyophilic surface is formed on one or more of the fluid contacting surfaces of the porous membrane by the atmospheric pressure microwave plasma treatment.

In some embodiments, surface polymer groups on one or more surfaces of the porous membrane are replaced with chemical groups during the plasma treatment which may be referred to as activation. During activation, the plasma can break down polymer bonds on the surface of the polymer and replace or modify then with carbonyl, carboxyl, hydroxyl groups or other desirable groups such as amine functional groups. Activation differs from a deposition process where a thin coating is formed on the surface of the membrane by a chemical or plasma treatment.

The modified membrane surfaces can have a composition whose surface analyzed by XPS has an oxygen to carbon ratio, a O/C ratio, that is different from the untreated membrane. In some versions of the APMW plasma modified membrane, the surfaces can have a composition whose surface analyzed by XPS has a fluorine to carbon ratio, an F/C ratio, that is different from the untreated membrane. In some versions of the invention, the O/C ratio can be between about 0.06 and about 0.08. In still other versions of the invention, the O/C ratio can be between about 0.04 and about 0.08.

The atmospheric pressure microwave plasma modified porous membranes have surface structure and chemistry that make it contact wettable with a solution of lower surface energy than the untreated membrane. For example, the surface energy of water can be modified by adding different amounts of a miscible organic liquid such as an alcohol to water. In some embodiments, the porous polymeric membrane treated by the atmospheric plasma has improved contact wettablity which may be determined with various solutions of MeOH in water. In some versions, the APMW plasma treated membranes with improved wettability can be contact wet with a minimum amount of MeOH in water in an aqueous solution that contains at least 1 wt % less MeOH than the minimum amount of MeOH in water used to contact wet an untreated sample of the porous membrane. In other versions the minimum amount of MeOH in the solution that contact wets the APMW plasma treated membrane sample contains at least 2 wt % less, in some cases at least 3 wt % less, in still other cases at least 4 wt % or less, and in still other versions at least about 4 wt % to about at least 7 wt % less MeOH than the minimum amount of MeOH in water used to contact wet an untreated sample of the porous membrane. For example, unmodified membrane in some version of the invention can be wet with 95-97 wt % MeOH in water while modified porous membrane surfaces prepared are contact wettable with a solution of 96 wt % or less MeOH in water; in other versions the porous membranes have surface structure and chemistry that make it contact wettable with a solution of: 95 wt % or less MeOH in water, 94 wt % or less MeOH in water, 93 wt % or less MeOH in water, 92 wt % or less MeOH in water, or 90 wt % or less MeOH in water. The lower the content of MeOH in the solution, the higher the surface energy of the treated membrane which improves its non-dewetting properties. The contact wettability of the atmospheric pressure microwave plasma treated membranes is stable after ambient storage as a dry membrane at room temperature in air for at least 10 days, in some versions after ambient storage for at least 30 days, and in other versions after ambient storage for 70 days or more. This is beneficial for long term use of filters and consistent flow properties in gas generating liquids.

The atmospheric pressure microwave plasma modified porous membranes have surface structure and chemistry that make it contact wettable with a solution of lower surface energy than the untreated membrane. For example, the surface energy of water can be modified by adding different amounts of a miscible organic liquid such as an alcohol to water. Versions of modified porous membrane surfaces prepared are contact wettable with a solution of 96 wt % or less MeOH in water; in other versions the APMW plasma treated porous membranes have surface structure and chemistry that make it contact wettable with a solution of 95 wt % or less MeOH in water, 94 wt % or less MeOH in water, 93 wt % or less MeOH in water, 92 wt % or less MeOH in water, or 90 wt % or less MeOH in water. The lower the content of MeOH in the solution, the higher the surface energy of the treated membrane which improves its non-dewetting properties. The contact wettability of the atmospheric pressure microwave plasma treated membranes is stable after ambient storage in air for at least 10 days, in some versions after at least 30 days, and in other versions after ambient storage in air for 70 days or more. This is beneficial for long term use of filters and consistent flow properties in gas generating liquids.

The porous membranes treated by the atmospheric pressure microwave plasma can be may be characterized by nominal pore size which is directly related to the membrane's particle retention characteristics. In some versions the porous membrane is a sieving filter that removes particles by a sieving mechanism. Pore size is proportional to the size of the particle retained by sieving filtration, and pore size can be related to flow rate through the membrane. It is desirable to maximize both particle retention and flow rate. Significantly increasing one of these characteristics while significantly reducing the other of these characteristics is undesirable and can be avoided in versions of the present invention which omit the use of solution based coatings to modify the membrane.

The atmospheric pressure microwave plasma treatment of the porous membranes can be utilized in amounts, for example power density, treatment time, number of treatments, feed rate of membrane through the plasma, or any combination of these, so that the treated porous membrane substrate is not substantially weakened, or shows a substantial increase in particle shedding, or exhibits a substantial change in particle retention, or exhibits a substantial change in pressure drop, or any combination of these membrane properties during filtration of purified water. Purified water can be deioinzed or distilled water. In some cases the purified water can be water having a TOC in the range of from 2 parts per billion up to 6 parts per billion or less, a resistivity of 17.7 megaohms-cm to 18.2 megaohms-cm or more, and average particle counts of less than 800 counts/liter for 0.05 micron sized particles. For example, the APMW plasma modified porous membrane of this invention has substantially the same permeability as measured by pressure drop as the unmodified porous membrane substrate. That is, this pressure drop does not vary by more than ±25% as compared to the pressure drop across the unmodified porous membrane substrate with the modified porous membrane of this invention. In some versions of the APMW plasma treated porous membrane, this pressure drop variation does not exceed ±15% and, in some versions, the variation does not exceed ±10% as compared to the pressure drop across the unmodified porous membrane substrate.

Membranes modified in accordance with this invention can have the particle retention properties of unmodified membranes while substantially maintaining the flux characteristics of the unmodified substrate. In addition, the atmospheric microwave plasma treated porous membrane composition does not promote the nucleation of gases on the surfaces of the membrane when in contact with or during filtration of an outgassing liquid; these membranes can be characterized as non-dewetting. Thus, when filtering an outgassing liquid such as but not limited to an SC1 or SC2 cleaning baths for wafers used in microelectronics manufacturing, the effective life of the membrane of this invention is significantly greater than the effective life of unmodified porous membranes. The porous membranes can be autoclaved and remain wet with liquid.

A comparison of the SEM of the starting and APMW plasma treated membrane show no apparent change in appearance. It is expected that the sieving particle retention properties of the membrane do not change or are within about ±25% or less, ±15% or less, and in some versions ±10% or less of the sieving particle retention of the untreated membrane. It is expected that the particle shedding of the treated membrane will be similar to the base membrane based on this analysis. The atmospheric pressure microwave plasma modified porous membrane in versions of the invention can be a microporous membrane that can have a sieving LRV of at least 3 for 0.1 micron or smaller particles in a liquid; can have a sieving LRV of at least 3 for 0.05 micron or smaller particles in a liquid; can have a sieving LRV of at least 3 for 0.03 micron or smaller particles in a liquid. LRV or log reduction value means the $\log_{10}$ value of the number of particles in the feed (filtrate) divided by the number of particles in the permeate liquid after passing through the membrane.

The atmospheric pressure microwave plasma treated porous membrane surfaces can be made free of ionic and or organic extractables which may be present in a solution of a coating material that is applied to a porous membrane to make it hydrophilic. This can minimize extractables, for example trace amounts of ionic and organic materials that can corrupt a fluid being filtered. In some embodiments the APMW plasma modified membrane have less than about 200 ppb total for extractable ions such as sodium, calcium, zinc, iron, copper, potassium, and aluminum. In some embodiments the APMW plasma modified membrane have less than about 20 ppb total for extractable ions such as sodium, calcium, zinc, iron, copper, potassium, and aluminum. The extractable content of the modified porous membrane can be determined by soaking a portion of the membrane in an acid solution of HCl or nitric acid for one or more days and analyzing the acid solution by ICPMS or other suitable technique. The extraction solution can be 10% v/v of 37% HCl in deionized water. In some versions the APMW plasma modified membranes have less than about 20 ppb of TOCs.

The porous membrane modified by the APMW plasma treatment can include coating free cast, extruded, coextruded, or laminated membranes used to filter liquids The porous membrane can comprise single porous layer, a layer having a pore size gradient, or multilayer (extruded or laminated membranes with one or more layers having different pore sizes for example) made from thermoplastics such as halogenated polyolefins like polytetrafluoroethylene, modified polytetrafluorethylenes, perfluoro (vinyl alkyl ether), FEP, UPE, polysulfone, or other membrane materials. The porous membrane can include a variety of morphologies such as lacy, string and node, open cellular, nodular or other membrane morphologies. The membrane can have a symmetric or asymmetric pore structure. In some versions the crystallinity of the thermoplastic for the membrane is greater than about 65%, in some versions greater than about 75%, and in still other versions greater than about 85%. Without wishing to be bound by theory, the higher the crystallinity of the membrane the more durable the lyophilic surface modification.

The atmospheric pressure microwave plasma treated porous membrane can comprise one or more layers. In some versions the porous membrane may or may include a filtration layer supported by one or more support layers or layers of different porosity. The layers can provide support for an inner filtration layer, for example large pore size support layers on either side of a tight smaller pore filtration layer. The layer may be a skinned membrane, may be a membrane without a discernable layer structure, or it may include a gradient of pores or a distribution of pore sizes. The layers can be coextruded, laminated, bonded, or fusion bonded together. In some versions the porous membrane is a microporous membrane.

Atmospheric pressure microwave plasma treated membranes of the present invention are integral and free of pinhole defects. They can be used as a flat sheet media, they retain sufficient strength for pleating and can be used to form pin hole free pleated membrane packs, or they retain sufficient strength to be bonded to other supports. For example, the APMW plasma treated membrane has sufficient strength and integrity that it can be pleated with one or more support or drainage support nets. The pleated APMW plasma modified membrane, drainage nets, a core, a cage, and endcaps can be bonded together to form a filter cartridge.

In some versions of the invention, the porous base membrane is free of an externally applied coating of monomers prior to atmospheric pressure microwave plasma treatment. Alternatively, in some embodiments, the gas used to form the plasma is free of polymerizable monomers.

The porous membrane substrate is a thin polymeric composition which can be used for separating impurities like particles, ions, proteins, gels from a fluid or slurry. In some versions the porous membrane has the retention and structural characteristics of a sieving filter in that it removes particles by a sieving mechanism as contrast to a depth media. The membrane can be those ultrafiltration or microfiltration membranes that when treated with the APMW plasma become contact wettable with a solution of MeOH in water, where the minimum amount of MeOH in water in the solution to contact wet the porous membrane is less than the minimum amount of MeOH in water in a control solution that contact wets an untreated sample of the porous membrane. In some versions the porous membrane is microporous or ultrafiltration membrane. Membrane pore sizes can be within the range of about 10 microns to about 0.001 microns. The membrane substrate can have any convenient geometric configuration that can be atmospheric pressure microwave plasma treated to form lyophilic or hydrophobic surfaces on portions of the membrane including a flat sheet, a corrugated sheet, a hollow fiber or the like. The membrane can be supported or unsupported, isotropic or anisotropic, skinned or unskinned or can be a composite membrane. The membrane substrate can have a thickness between about 5 microns and about 250 microns, preferably between about 10 microns and about 200 microns, and more preferably between about 10 and about 30 microns. Porous membrane substrates can include porous or microporous halogenated polypolyolefins such as polyvinylchloride, polyvinylidenefluoride, polytetrafluoroethylene, and the like. Porous membrane substrates can include polyolefins such as polyethylene, including ultra high molecular polyethylene (UHMWPE) with molecular weight of between about 1 million to about 6 million, polypropylene and polymethylpentene. Porous membranes can include polysulfone, polyethersulfone, polyimide, and polyamide. Fluorine-containing polymers can include polytetrafluoroethylene (PTFE), fluorinated ethylene-propylene copolymer (FEP), ethylene-tetrafluoroethylene copolymer or a perfluoroalkoxy polymer (PFA). In some versions the fluorine-containing polymers can be modified PTFE resins containing at least 98 percent tetrafluoroethylene with modifiers such as but not limited to hexafluoropropylene, perfluoro(alkyl vinyl ether), mixtures of these or others. In some versions of the invention the porous polymer is PTFE or expanded PTFE.

In one version of this invention, a surface modified porous membrane is formed having an average pore size of 0.05 micron or less. The membrane is formed from a fluorine-containing polymer membrane substrate comprising polytetrafluoroethylene. The porous membrane substrate has its surfaces modified by passage through an atmospheric pressure microwave plasma apparatus at a power of greater than about 400 watts. The plasma modified porous membrane is contact wettable with a solution containing 96 wt % MeOH or less in water, the modified porous membrane is non-dewetting, the membrane remains translucent, following autoclave treatment in water at about 135° C. for about 40 minutes.

Atmospheric pressure microwave plasma treatment modifies the surface energy of one or more of the plasma treated porous membrane surfaces. These surfaces can include the outer handling surfaces as well as inner pore surfaces. The polymeric porous membrane can have a portion of one or more fluid contacting surfaces APMW plasma treated, or the porous membrane can have all of its fluid contacting surfaces completely atmospheric pressure microwave plasma modified. Both sides of the porous membrane can be treated in the plasma using one or more passages through the treatment cavity. The higher the density of surface groups formed on the porous membrane surfaces, the greater the wettability and the more resistant the porous membrane is to dewetting when filtering a gas containing liquid, a gas generating liquid or other similar fluid.

The pressure drop of a filter is a measure of the resistance of the filter to liquid flow. A high pressure drop indicates a high liquid flow resistance, such as when the filter is dewet or is plugged by a gas or particles in the membrane pores. A low pressure drop indicates a low liquid flow resistance, such as when the filter is new and completely wet. In most cases, pressure drop data should be considered relative to the same filter before and after atmospheric microwave plasma treatment. Pressure drops can be measured in pounds per square inch (psi) or Pascals of differential pressure across the filter normalized at a constant liquid-flow rate of 1.0 U.S. gallon per minute (gpm) or 3.78 liters per minute (lpm). During testing, pressure drop is most preferably measured with purified water on a pre-wet and flushed filter.

Contact wettability refers to the ability of a sample of a test liquid applied to a portion of porous membrane to fill the pores of the membrane with the test liquid throughout the thickness of the membrane. The wet portions of the membrane appear transparent compared to un-wet portions of the membrane. Contact wettability refers to the ability of a sample of a test liquid applied to a portion of a porous membrane to immediately, or within about 1-2 seconds, fill the pores of the membrane throughout its thickness with the test liquid such that the membrane appears transparent relative to the opaque appearance of portions of the membrane un-wet by the applied liquid. The wet portion of the porous membrane permits a flow of the liquid through the membrane. In contrast, the base membrane or a porous membrane insufficiently treated by APMW plasma to make it lyophilic or hydrophilic will remain opaque when the test liquid is applied to it or the membrane may slowly, greater than about 5 to about 15 seconds, begin to wet the portion of the porous membrane with the liquid applied to it.

The wetting property of the membrane can be determined by applying test liquids of various surface energy to the plasma modified polymeric membranes in versions of the invention.

The atmospheric pressure microwave plasma modified polymeric porous membrane surfaces that are contact wettable are also non-dewetting. Non-dewetting refers to modified porous membranes compositions that remains wet with liquid after contacting or filtering a gas containing liquid; the gas does not displace sufficient liquid from the pores of the membrane to increase the opacity, increase the pressure drop, or increase flow time characteristics of the APMW plasma treated membrane surfaces. An increase in any of these properties greater than 25% is considered a dewet membrane.

The non-dewetting properties of APMW plasma treated porous membranes of the present invention can be determined by heating a membrane sample wet with a liquid in an autoclave above the boiling point of the liquid. If a porous membrane sample is non-dewetting, the sample will remain wet and translucent following the autoclave treatment. For example, if a wet APMW plasma treated porous membrane sample is non-dewetting, the sample will remain wet and translucent following autoclave treatment. If a wet base membrane or a wet APMW plasma insufficiently treated to make it lyophilic or hydrophilic is subject to the same autoclave treatment, it will de-wet and appear opaque following autoclave treatment. In another illustrative example, an APMW plasma treated PTFE porous membrane wet with water is non-dewetting if following autoclave treatment at a temperature of 135° C. in water for 40 minutes the porous membrane remains translucent. Non-dewetting differs from a contact angle measurements of a film's surface energy in that non-dewetting refers to the wetting property of the membrane throughout the membrane's thickness rather than just an outer surface of the membrane.

Dewetting can be measured on treated porous membrane coupons. The membrane may be wet with a low surface tension liquid. For example it can be wetted by isopropanol, then rinsed or flushed with water to remove the IPA from the membrane. The membrane can be placed into a container with water and placed into an autoclave at 135° C. for about 40 minutes. During the autoclave process gas dissolved in the water will come out of solution, the solubility of the gas in water decreases in the autoclave, and the gas can displace water in an untreated membrane. This is an example of a gas containing liquid contacting the membrane. Flow times before and after the autoclave treatment may be performed to determine the change in flow time after autoclaving. An increase in flow time for DI water of greater than 25% after autoclave treatment can be used to characterize a dewetting membrane.

The APMW plasma modified porous membrane composition also prevents or reduces dewetting of the membrane during exposure of the membrane to gases such as air, as long as the membrane is not exposed for a period of time sufficiently long to cause drying of the membrane. This for example could be determined by weight change of a wet membrane sample compared to its dry weight. During use in a filtration process, the filter can be exposed to air under small pressure differentials across the filter such as during a replacement of the liquid being filtered.

A flow time for a porous membrane sample can be determined by wetting a sample of membrane with a low surface tension liquid, and then flushing the membrane to remove residual wetting liquid. At a fixed pressure inlet to the membrane and a known volume of liquid, the time it takes to flow the liquid (which can be temperature corrected for viscosity) through an area of the membrane can be measured. For tight membranes the flow time is longer than for more open membranes. For example, a pressure of about 10-12 psi can be used to flow about 100 ml of water through an IPA wet and water flushed porous membrane having an area of about 20 cm$^2$ and the time measured. This test can be made on control, APMW plasma treated samples, as well as autoclave treated samples of porous membrane and the flow time and temperature measured. The test can use filtered water as the liquid. This helps to exclude other potential flow rate reducing effects due to viscosity differences in the liquid or due to increased resistance to flow caused by particulates removed from the liquid which can become trapped on the membrane surfaces.

Versions of the invention may include an APMW plasma treated membrane configured to remove contaminants from liquid in a fluid flow circuit. The membrane may be configured in a filter cartridge and the filter used to remove particles from an SC1 or SC2 cleaning bath in a re-circulating or single pass wafer cleaning apparatus.

A water bubble point pressure test can also be used to characterize the degree of dewetting observed in an APMW plasma treated porous membrane or control porous membrane. Generally the lower the water bubble point pressure of a membrane, the higher the potential for dewetting upon exposure to air. The water bubble point pressure of the APMW plasma treated porous membranes of the present invention are greater than the water bubble point pressure of insufficiently unmodified or control porous membrane substrates. The water bubble point pressure test method measures the pressure used to force air through the pores of a membrane which were previously filled with water.

The particle retention properties of the APMW plasma treated porous membranes can be compared to the porous membrane substrate having an unmodified surface as measured by a modified SEMATECH particle retention method described in Millipore Corporation Technical Document MA041, available from Millipore Corporation, Bedford, Mass., USA and which is incorporated herein by reference. In some versions of the invention it is expected that the particle retention properties of the treated membrane will be substantially the same, within about ±25% or less, than the unmodified membrane.

EXAMPLE 1

Atmospheric pressure microwave plasma treatment of multilayer (support, filtration, support) 0.03 micron PTFE membrane samples was performed with different gas species, flow rates, power, voltage and treatment times (line speed). In this example, pieces of membrane were cut into 12"×4" pieces and atmospheric plasma treated at various conditions on a rotating electrode (one electrode is moving and the other one is fixed). The experimental conditions and results are listed Table 1.

The strength (max load) of control an APMW plasma modified porous membranes are summarized in Table 1. The results show that modified membranes retain greater than 70% (substantially) of their original strength and have improved wettability compared to the control sample. Through choice of conditions, the strength of the modified-membrane can be greater than 80%, greater than 90% and greater than 95% of the untreated porous membrane. Higher strength is advantageous because it permits higher differential pressures and or temperatures to be used while maintaining membrane integrity; it also provides higher yields during bonding and cartridge making operations.

The contact wettability of atmospheric plasma treated porous membrane (samples 1-12) after initial treatment, day 0, and following extended ambient storage, day 71, are also given in Table 1. The contact wettability of each of the porous membranes following the APMW plasma treatment improved relative to the control sample because a test liquid with less MeOH by weight could be used to contact wet the APMW plasma treated porous membranes. The wettability following extended storage in air showed that no change in contact wettability occurred after 71 days exception the sample made under the conditions in sample 9. In sample 9, the contact wettability changed slightly, the amount of MeOH used to wet the membrane increased from 93 wt % to 94 wt %. The membrane had better wetting properties than the control. These results show that APMW plasma treatment of porous membranes can be used to form stable contact wettable porous membranes.

TABLE 1

0.03 μm PTFE APMW plasma porous membrane.

| | | Conditions | | | | Wettablity | | Max Load | |
|---|---|---|---|---|---|---|---|---|---|
| Sample | Gas species | Gas Flow Rate (SLM) | Power (w) | Voltage (kv) | Line speed (ft/min) | Day 0 | Day 71 | (N) | % |
| control | | | | | | 95% | 95% | 29 | |
| 1 | He | 3 | 400 | 3.7 | 65 | 94% | 94% | 26 | 90% |
| 2 | He | 3 | 850 | 5.3 | 65 | 94% | 94% | 29 | 101% |
| 3 | He | 3 | 850 | 5.3 | 9.8 | 93% | 93% | 26 | 89% |
| 4 | He | 5 | 1250 | 5.9 | 9.8 | 93% | 93% | 27 | 95% |
| 5 | He | 3 | 1500 | 6.4 | 9.8 | 93% | 93% | 25 | 87% |
| 6 | $O_2$/He | 1SLM/2SLM | 1500 | 6.4 | 9.8 | 93% | 93% | 28 | 95% |
| 7 | $O_2$ | 3 | 1500 | 6.4 | 9.8 | 93% | 93% | 28 | 95% |
| 8 | He | 3 | 1500 | 6.4 | 9.8, twice | 93% | 93% | 21 | 73% |
| 9 | $H_2$ | 3 | 1500 | 6.4 | 9.8 | 93% | 94% | 26 | 91% |
| 10 | He | 3 | 600 | 4 | 9.8 | 93% | 93% | 27 | 92% |
| 11 | He/$C_2H_2$ | 2.85 slm/0.15 slm | 2400 | 6.5 | 9.8 | 93% | 93% | 23 | 79% |
| 12 | He | 3 | 2400 | 6.5 | 9.8 | 93% | 93% | 24 | 83% |

The results for the samples in Table 1, example 2-12 showed that the wettability was improved after atmospheric plasma treatment. The results show that a polymeric porous membrane treated by an atmospheric pressure microwave plasma in the presence of a gas including such as He or a mixture of He and a source of oxygen results in a modified porous membrane that is contact wettable with a solution of MeOH in water, where the minimum amount of MeOH in water in the solution to contact wet the porous membrane is at least 1 wt % less, and in some cases at least 2 wt % less, than the minimum amount of MeOH in water in a control solution that contact wets an untreated sample of the porous membrane. The surface tension in dynes/cm for various aqueous methanol and water solutions can be found in Lange's Handbook of Chemistry, 11$^{th}$ Ed. For example, the untreated sample 1, initial 0.03 μm PTFE membrane, could be wetted by an MeOH solution with an MeOH concentration equal to or greater than 95 wt % in water. After atmospheric pressure microwave plasma treatment, the modified membranes could be wet by 93-94 wt % MeOH solution, which indicates better wettability and reduced surface energy of the modified membrane. The results also show that after the initial wetting and drying in air that the membrane retained its contact wettability following ambient storage at room temperature in air after 10 days or more and after 70 days or more. These results illustrate that the APMW plasma modification is stable such that the contact wettability remains essentially constant over time, or the wettability changes by 1% or less in the added amount of MeOH in the aqueous solution used to contact wet the membrane following the initial plasma treatment (see sample (9) for example).

EXAMPLE 2

The conditions and results of an atmospheric pressure microwave plasma treatment of a single layer 0.05 micron PTFE porous membrane are listed in Table 2.

TABLE 2

0.05 μm PTFE single layer porous membrane APMW plasma treated

| | | Conditions | | | | Wettablity | | Max Load Newtons | |
|---|---|---|---|---|---|---|---|---|---|
| Example | Gas species | Gas Flow Rate (SLM) | Power (w) | Voltage (kv) | Line speed (ft/min) | Day 0 | Day 71 | (N) | % |
| control | | | | | | 97% | | 34 | |
| 13 | He | 3 | 2400 | 6.5 | 9.8 | 96% | 96% | 28 | 81% |

Sample 13 showed that the wettability was improved after atmospheric plasma treatment and that the membrane retained greater than 80% of its strength. The untreated control sample, initial 0.05 micron PTFE membrane, could be wetted by an MeOH solution with an MeOH concentration equal to or greater than 97 wt % MeOH. After atmospheric pressure microwave plasma treatment, the modified membrane sample 13 could be contact wet by 96 wt % MeOH solution, which indicates better wettability. The results show that the membrane retained its contact wettability following ambient storage after 10 days or more and after 70 days or more. For example the APMW membrane was initially contact wet with various MeOH and water solutions to determine the contact wettability of the sample and then subsequently the modified membrane was allowed to dry in air. After 10 days storage in air at room temperature, ambient conditions, the dry modified membrane was contact wet with MeOH and water solutions to again determine the contact wettability of the modified membrane. This wet membrane was allowed to dry and after a total of 71 days storage in ambient conditions the dry modified membrane was contact wet with MeOH and water solutions to again determine the contact wettability of the modified membrane.

EXAMPLE 3

Untreated 0.05 micron PTFE porous membrane and 0.05 micron PTFE porous membrane following atmospheric pressure microwave plasma treatment were first wet by isopropanol, then rinsed or flushed with water completely. The porous membrane sample was put into disk holder under restraint and soaked in distilled water in an autoclave at 135° C. for 40 min. The deionized (DI) water flow rate on the autoclave treated samples (control and APMW plasma treated membrane) was measured before and after autoclave with positive pressure at 14.2 psi. Results are shown in Table 3.

TABLE 3

Autoclave non-dewetting test results

DIW Flux (L/m² – s)

| 0.05 um PTFE | Before Autoclave | After Autoclave | Flux loss |
|---|---|---|---|
| Before | 0.79 | 0.64 | 19% |
| APMW | 0.98 | 0.66 | 33% |
|  | 0.84 | 0.74 | 11% |
| After APMW | 1.26 | 1.31 | 0% |
|  | 1.39 | 1.45 | 0% |

APMW: atmospheric pressure microwave plasma treated.

For the unmodified membranes, "before APMW", Table 3 showed that autoclaving resulted in about an 11-33% flux loss caused by membrane dewetting. However as shown in Table 3, the APMW plasma modified membrane samples were non-dewetting and did not show any flux loss after one cycle of the autoclave test.

Table 3 showed that the flow time of the atmospheric pressure microwave plasma treated membranes did not decrease relative to the membranes before APMW treatment. Without wishing to be bound by theory, this flow result may suggest that membrane pore were enlarged due to stretching of the membrane on a non-optimized tensioner.

EXAMPLE 4

Vacuum plasma treatment of multilayer (support, filtration, support) 0.03 micron PTFE membrane samples in helium gas (Table 4) and hydrogen gas (Table 5) gas were prepared to provide modified membranes having contact wettability in a solution of 94 wt % MeOH in water. These vacuum plasma treated membranes had slightly lower contact wettability or about the same (compared to sample 1) as those in Table 1. The strength test results show that the vacuum treated samples, even at reduced power (250-300 W) compared to the power used for the APMW plasma treated samples (400-2400 watts), resulted in modified porous membranes whose strength was almost reduced by half compared to the control samples. It was also observed that a vacuum plasma treatment time of about 1 minute for these porous membranes under these conditions did not form a modified PTFE porous membrane that was wettable with 94% MeOH (short time was used to try to minimize membrane strength degradation under vacuum plasma conditions—results for this short treatment are not given in Table 4 or Table 5).

TABLE 4

Frequency (13.56 MHz), 300 W, pressure 300 mtorr, Helium flow 1.00 sccm.

| Membrane | Flow Time (s/500 ml IPA) | MBP (psi) | Max Load (N) | Wettability MeOH |
|---|---|---|---|---|
| Control | 1105 | 63 | 23 | 95-96% |
| He plasma VP 6 | 1114 | 63 | 13 | 94% |

TABLE 5

Frequency (13.56 MHz), 250 W, pressure 300 mtorr, $H_2$ flow 100 sccm.

| Membrane | Flow Time (s/500 ml IPA) | MBP (psi) | Max Load (N) | Wettability MeOH |
|---|---|---|---|---|
| Control | 1047 | 62 | 29 | 95-96% |
| $H_2$ plasma VP7 | 1024 | 63 | 16 | 94% |

Flow time tests were performed and illustrate that the flow time did not decrease upon vacuum plasma treatment. Flow time tests were performed with a UPE disk holder and at 14.2 psi.

These comparative results show that stronger membranes can be formed using APMW plasma treatment for the same level of wettability compared to vacuum treated membranes. Stronger porous membranes are advantageous for bonding and or pleating of modified membranes into devices and is advantageous because the stronger membranes can withstand greater process pressures and temperature without integrity loss.

EXAMPLE 5

This example illustrates the atmospheric pressure microwave plasma treatment of porous membranes and their contact wettability and strength. For this experiment set, the membrane was treated 10 times in a plasma using a power of 2.4 KW and helium flow rate at 3 slm or static Air environment. In this example, the samples had membrane thickness of about 15-20 microns and generally less than about 30 microns.

The strength of the membrane was determined in a web direction (WD) and a machine direction (MD). The strength of the control samples (14, 23, and 32) are given in the Table 6 and are about 24 Newtons (N) or more. Treated sample, for example 34 had a WD of 12.7 N and a MD of 22.7 N which averaged to about 70% of the Control. In another sample, for example sample 18, the strength was WD of 32.8 N and a MD of 40.7 N which averaged to about 73% of the control.

The results of these experiments are summarized in Table 6 and show modified membranes with improved contact wettability and an average strength of greater than about 70% of the starting porous membrane could be made. The O/C ratio of the atmospheric pressure microwave modified membranes was different from the untreated membrane. In these samples it ranged from about 0.04 to about 0.08. Sample 18 had an O/C ratio of 0.063; sample 19 had an O/C ratio of 0.064; sample 34 had an O/C ratio of 0.077; sample 39 had an O/C ratio of 0.044.

The results show that a polymeric porous membrane treated by an atmospheric pressure microwave plasma in the presence of a gas including a gas like He or air result in a modified porous membrane that is contact wettable with a solution of MeOH in water, where the minimum amount of MeOH in water in the solution to contact wet the porous membrane is at least 1 wt % less, in some cases at least 2 wt % less, in other cases at least 3 wt % less, in still other cases at least 4 wt % or less, and in some other cases at least about 4 to about 7 wt % less than the minimum amount of MeOH in water in a control solution that contact wets an untreated sample of the porous membrane. For example, the untreated sample 14, initial 0.03 µm PTFE membrane, could be wetted by an MeOH solution with an MeOH concentration equal to or greater than 97 wt % in water. After atmospheric pressure microwave plasma treatment in an atmosphere with a flow of helium, the modified membranes could be wet by 94 wt % (samples 16-18) MeOH solution, which is 3 wt % less MeOH and indicates better wettability. The untreated sample 32, initial 0.05 µm PTFE membrane, could be wetted by an MeOH solution with an MeOH concentration equal to or greater than 97 wt % in water. After atmospheric pressure microwave plasma treatment in an atmosphere with a flow of air, the modified membranes could be wet by 90-93 wt % MeOH solution (samples 37-40), which is 4-7 wt % less MeOH and indicates better wettability.

Although the present invention has been described in considerable detail with reference to certain preferred versions thereof, other versions are possible. Therefore the spirit and scope of the appended claims should not be limited to the description and the preferred versions contain within this specification.

What is claimed is:

1. A porous polymeric membrane having one or more surfaces modified by an atmospheric pressure microwave (APMW) plasma and a strength of at least 70% of a strength of the porous polymeric membrane unmodified by the APMW plasma, wherein the porous polymeric membrane modified by the APMW plasma;
    is contact wettable with a solution of methanol in water having at least 1 weight percent less methanol than a solution of methanol in water that contact wets the porous polymeric membrane unmodified by the APMW plasma; and
    comprises a halogenated polyolefin.

2. The porous polymeric membrane of claim 1, wherein the porous polymeric membrane modified by the APMW plasma has an O/C ratio between 0.06 and 0.08.

3. The porous polymeric membrane of claim 1, wherein the porous polymeric membrane modified by the APMW plasma is contact wettable after 10 days of ambient storage with a solution of 96 weight percent or less of methanol in water.

4. The porous polymeric membrane of claim 1, wherein the halogenated polyolefin is polytetrafluorethylene or a modified polytetrafluoroethylene.

TABLE 6

APMW (2.45 GHz) plasma treated porous membrane.

| Pore size | Condition Gas | SLM | Sample# | MeOH Wettability Side-A | Side-B | Max Load (N) WD | % | MD | % |
|---|---|---|---|---|---|---|---|---|---|
| 0.03 um | | | 14 | 97% | 97% | 46.3 | | 53.7 | |
| | He | 3 | 15 | 95% | 95% | 39.3 | 85% | 43.4 | 81% |
| | | | 16 | 94% | 94% | | | | |
| | | | 17 | 94% | 94% | | | | |
| | | | 18 | 94% | 94% | 32.8 | 71% | 40.7 | 76% |
| AVE | | | | | | | 78% | | 78% |
| | AIR | | 19 | 92% | 92% | 43.0 | 93% | 45.0 | 84% |
| | | | 20 | 93% | 94% | 43.2 | 93% | 52.1 | 97% |
| | | | 21 | 92% | 92% | | | | |
| | | | 22 | 92% | 92% | | | | |
| AVE | | | | | | | 93% | | 90% |
| 0.03 um | | | 23 | 96% | 96% | 40.7 | | 56.7 | |
| | He | 3 | 24 | 95% | 95% | 34.7 | 85% | 49.2 | 87% |
| | | | 25 | 95% | 95% | | | | |
| | | | 26 | 95% | 94% | | | | |
| | | | 27 | 94% | 95% | 33.9 | 83% | 50.4 | 89% |
| AVE | | | | | | | 84% | | 88% |
| | AIR | | 28 | 92% | 92% | 35.5 | 87% | 56.5 | 100% |
| | | | 29 | 92% | 92% | 36.0 | 88% | 52.0 | 92% |
| | | | 30 | 92% | 92% | | | | |
| | | | 31 | 92% | 92% | | | | |
| AVE | | | | | | | 88% | | 96% |
| 0.05 um | | | 32 | 97% | 97% | 24.0 | | 26.0 | |
| | He | 3 | 33 | 95% | 95% | 19.7 | 82% | 22.2 | 85% |
| | | | 34 | 93% | 94% | 12.7 | 53% | 22.7 | 87% |
| | | | 35 | 93% | 93% | | | | |
| | | | 36 | 93% | 94% | | | | |
| AVE | | | | | | | 67% | | 86% |
| | AIR | | 37 | 90% | 90% | 15.3 | 64% | 24.5 | 94% |
| | | | 38 | 92% | 93% | 20.3 | 85% | 24.9 | 96% |
| | | | 39 | 92% | 92% | | | | |
| | | | 40 | 92% | 92% | | | | |
| AVE | | | | | | | 74% | | 95% |

5. The porous polymeric membrane of claim 1, wherein the porous polymeric membrane includes a filtration layer and a support layer.

6. The porous polymeric membrane of claim 5, wherein the filtration layer and the support layer are coextruded, laminated, bonded, or fusion bonded together.

7. The porous polymeric membrane of claim 5, wherein the filtration layer and the support layer are pleated together.

8. A method of modifying the contact wettability of a porous polymeric membrane comprising a halogenated polyolefin with atmospheric pressure microwave plasma (APMW), the method comprising contacting the porous polymeric membrane with APMW plasma, and treating one or more surfaces of the porous polymeric membrane with the APMW plasma, wherein contacting the porous polymeric membrane with the APMW continues until the contact wettability of the treated membrane is increased such that the treated porous polymeric membrane is non-dewetting and the strength or average strength of the treated porous polymeric membrane is not reduced below 70% of the strength of the untreated porous polymeric membrane, thereby modifying the contact wettability of the porous polymeric membrane.

9. The method of claim 8, wherein the halogenated polyolefin is polytetrafluoroethylene or a modified polytetrafluoroethylene.

10. The method of claim 8, wherein the APMW plasma comprises a source of oxygen.

11. The method of claim 10, wherein the source of oxygen is selected from the group consisting of water vapour, an alcohol, air, and combinations of these.

12. The method of claim 8, wherein the atmospheric pressure microwave plasma comprises a noble gas.

13. The method of claim 8, wherein the treated membrane is contact wettable after 10 days of ambient storage with a solution of 96 weight percent or less of methanol in water.

14. The method of claim 8, further comprising bonding or pleating the treated porous polymeric membrane to a support layer.

15. A multi-layer halogenated polyolefin microporous membrane having one or more surfaces modified by an atmospheric pressure microwave (APMW) plasma, the microporous membrane comprising:

a filtration layer; and
a support layer, the microporous membrane having a strength of at least 70% of a strength of the microporous membrane unmodified by the APMW plasma, wherein the microporous membrane modified by the APMW plasma is contact wettable with a solution of methanol in water having at least 1 weight percent less methanol than a solution of methanol in water that contact wets the microporous membrane unmodified by the APMW plasma.

16. The microporous membrane of claim 15, wherein the filtration layer and the support layer are coextruded, laminated, bonded, or fusion bonded together.

17. The microporous membrane of claim 15, wherein the filtration layer and the support layer are pleated together.

18. The microporous membrane of claim 15, wherein the microporous membrane has a strength of at least 20 Newtons.

* * * * *